United States Patent [19]

Frazier et al.

[11] 4,113,147

[45] Sep. 12, 1978

[54] VACUUM BOTTLE WITH AIR PUMP TO PRESSURIZED BOTTLE TO EFFECT DISPENSING

[75] Inventors: Albert A. Frazier, Nashville; Howard W. Phillips, Brentwood, both of Tenn.

[73] Assignee: Aladdin Industries, Incorporated, Nashville, Tenn.

[21] Appl. No.: 837,519

[22] Filed: Sep. 29, 1977

Related U.S. Application Data

[63] Continuation-in-part of Ser. No. 803,736, Jun. 6, 1977, abandoned.

[51] Int. Cl.² ............... F04B 43/02; B65D 47/34; B67D 5/42; B67D 5/54
[52] U.S. Cl. ............... 222/131; 222/209; 222/383; 222/401
[58] Field of Search ............ 222/209, 373, 400.5, 222/400.8, 401, 402, 211, 383, 385, 131; 251/859

[56] References Cited

U.S. PATENT DOCUMENTS

| | | | |
|---|---|---|---|
| 2,223,256 | 11/1940 | Kross | 222/211 X |
| 2,710,711 | 6/1955 | Hutton | 222/400.8 |
| 2,771,226 | 11/1956 | Bates | 222/401 |
| 2,965,907 | 12/1960 | Ropelato | 222/209 X |
| 3,827,456 | 8/1974 | Sheppard | 137/859 |
| 3,905,520 | 9/1975 | Nishioka | 222/383 X |

FOREIGN PATENT DOCUMENTS

| | | | |
|---|---|---|---|
| 568,748 | 11/1975 | Switzerland | 222/209 |
| 179,740 | 5/1922 | United Kingdom | 222/401 |

OTHER PUBLICATIONS

Zijirushi, Vacuum Bottle Co. Ltd., "Air Pot", Elephant Brand.

*Primary Examiner*—David A. Scherbel
*Attorney, Agent, or Firm*—McDougall, Hersh and Scott

[57] ABSTRACT

A vacuum bottle includes a pump dispenser for dispensing liquids from the temperature insulating interior without the need for removing the top or pouring. The pump dispenser employs a manually operated disk to pump air from a diaphragm into the bottle interior where it forces the liquid contents up a fluid tube and out a dispensing spout. A plurality of spaced ribs improve the operation of the dispenser mechanism by preventing twisting of the disk during pumping.

17 Claims, 10 Drawing Figures

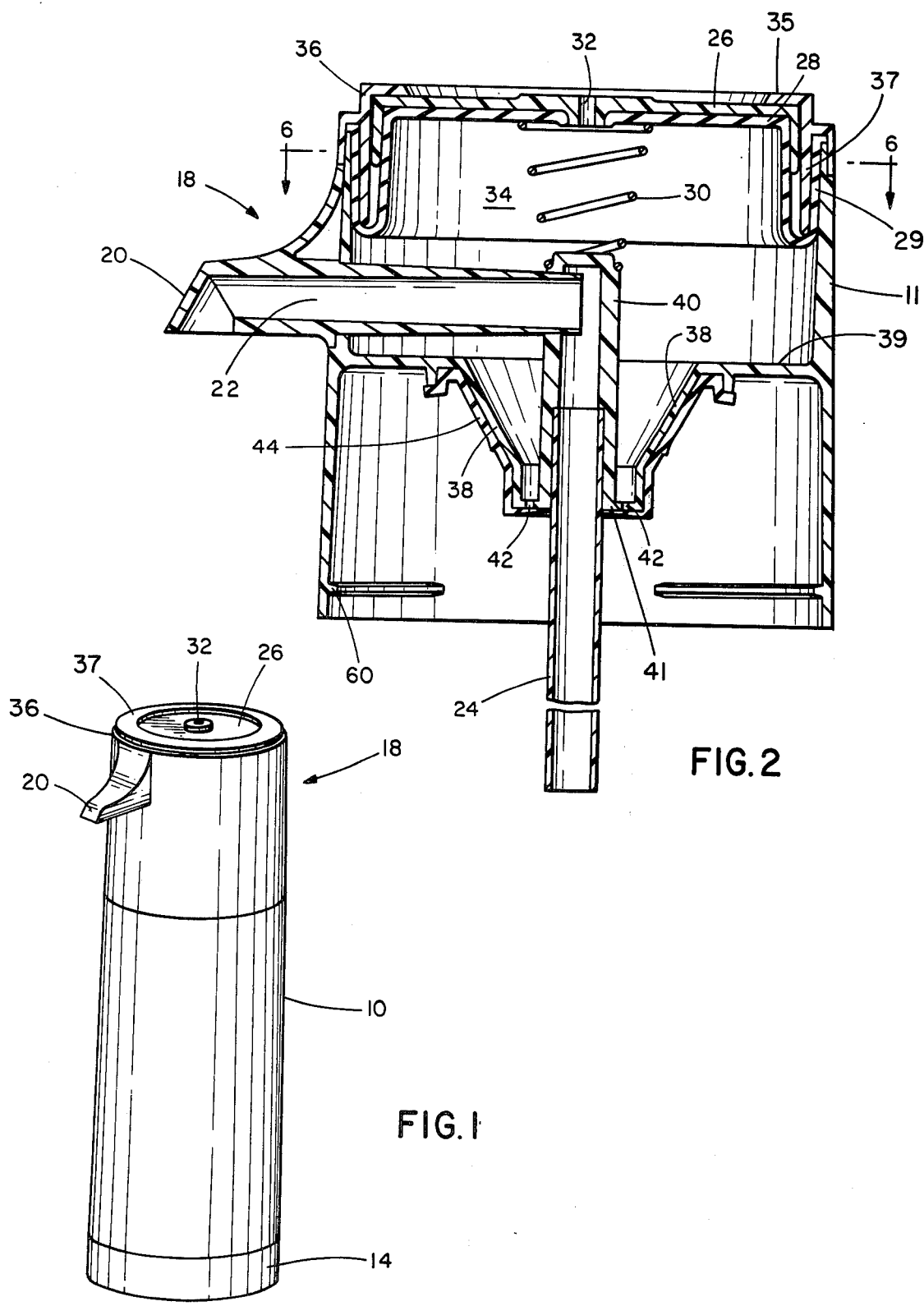

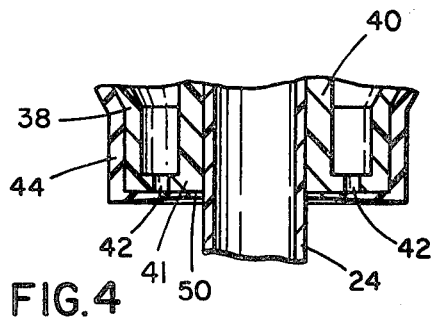
FIG.4
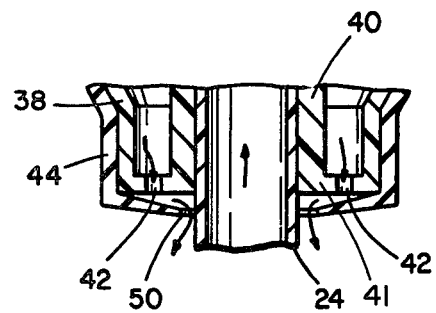
FIG.5
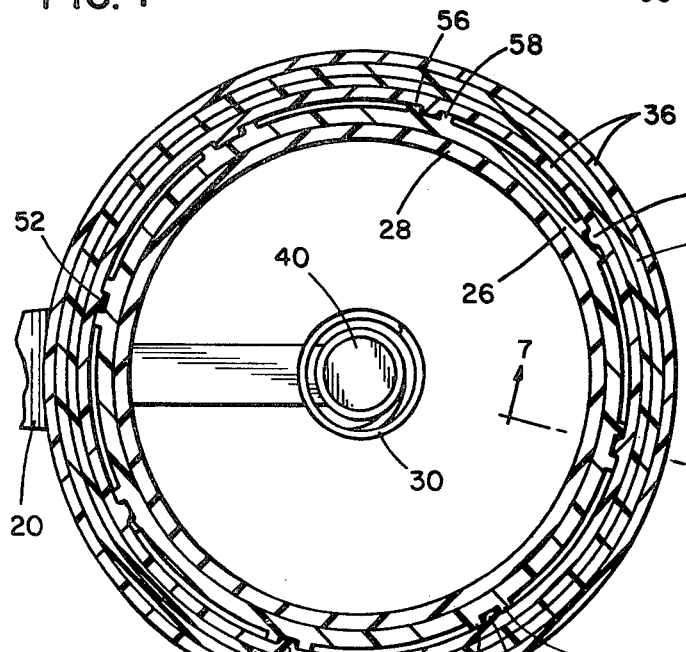
FIG.6
FIG.7
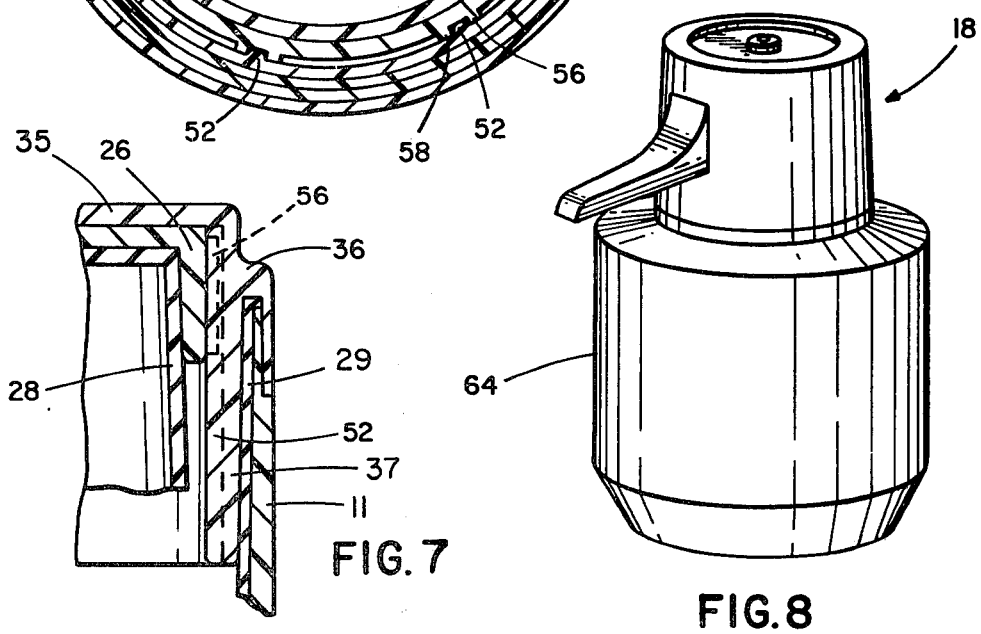
FIG.8

VACUUM BOTTLE WITH AIR PUMP TO PRESSURIZED BOTTLE TO EFFECT DISPENSING

CROSS REFERENCE TO RELATED APPLICATION

This application is a continuation-in-part of application Ser. No. 803,736, filed June 6, 1977, now abandoned.

BACKGROUND OF THE INVENTION

This invention relates to the field of vacuum insulated containers of the type commonly referred to as thermos bottles. More specifically, it relates to an improvement in thermos bottle construction whereby the need to remove a cap to dispense the liquid therefrom is avoided. Since the purpose of a thermos bottle is to maintain its contents at a desired serving temperature, either hot in the case of coffee and the like or cold in the case of soft drinks, it is desirable to maintain the integrity of the vacuum unit to prevent heat transfer.

Prior thermos bottle designs, whether wide mouth or narrow mouth in construction, usually require that a cap be removed and the bottle be tipped to some degree to pour the contents from the bottle. During this dispensing operation the insulating properties of the bottle are impaired. Another disadvantage of prior designs is that during pouring it is easy to spill the contents and if the liquid is hot, burns can result. The present invention provides an improved vacuum bottle design which avoids the necessity for pouring liquids therefrom and which maintains the integrity of the temperature insulating bottle. These objectives are accomplished by the provision of a pump dispenser as part of the vacuum bottle design. The dispenser is mounted on the top of the bottle in place of a cap and permits the dispensing of liquids from the heat insulating interior in response to manual pumping.

Pump units for vacuum bottles have been developed by others. These devices are highly complex employing a great number of components and being relatively more expensive to manufacture than the present invention. The present invention achieves its simplicity through the use of a user controlled air intake and an efficient design whereby many of the components serve more than one function in the overall design.

It is, accordingly, one object of the invention to provide a simple low cost pump unit having a vacuum insulated or similarly insulated bottle which employs a relatively low number of reliable components to accomplish its fluid pumping function.

Another object of the invention is the provision of a pump dispenser for a vacuum bottle which can be substituted for a cap of existing vacuum bottles.

A further object is the provision of a pump dispenser for an insulating container, such as a Styrofoam container, which dispenser can be utilized in place of a cap.

A further object is the provision of a pump dispenser which is manually operated to dispense liquids from the interior of a container and which employs a mechanically operated pumping device free from jamming due to angular movement of the pumping disk.

Other objects and advantages of the invention will be apparent from the remaining portion of the specification.

BRIEF DESCRIPTION OF THE DRAWINGS

FIG. 1 is a perspective view of a thermos bottle and pump dispenser according to the invention.

FIG. 2 is a cross sectional view of the pump dispenser according to the invention.

FIGS. 4 and 5 are enlarged sectional views of the lower portion of the pump dispenser illustrating operation of the gasket seal.

FIG. 6 is a sectional view along the lines 6—6 of FIG. 2.

FIG. 7 is a sectional view along the lines 7—7 of FIG. 6.

FIG. 8 illustrates the use of a pump unit according to the present invention on a nonvacuum insulated container of a larger size than the thermos bottle of FIG. 1.

DETAILED DESCRIPTION

Figure 3:
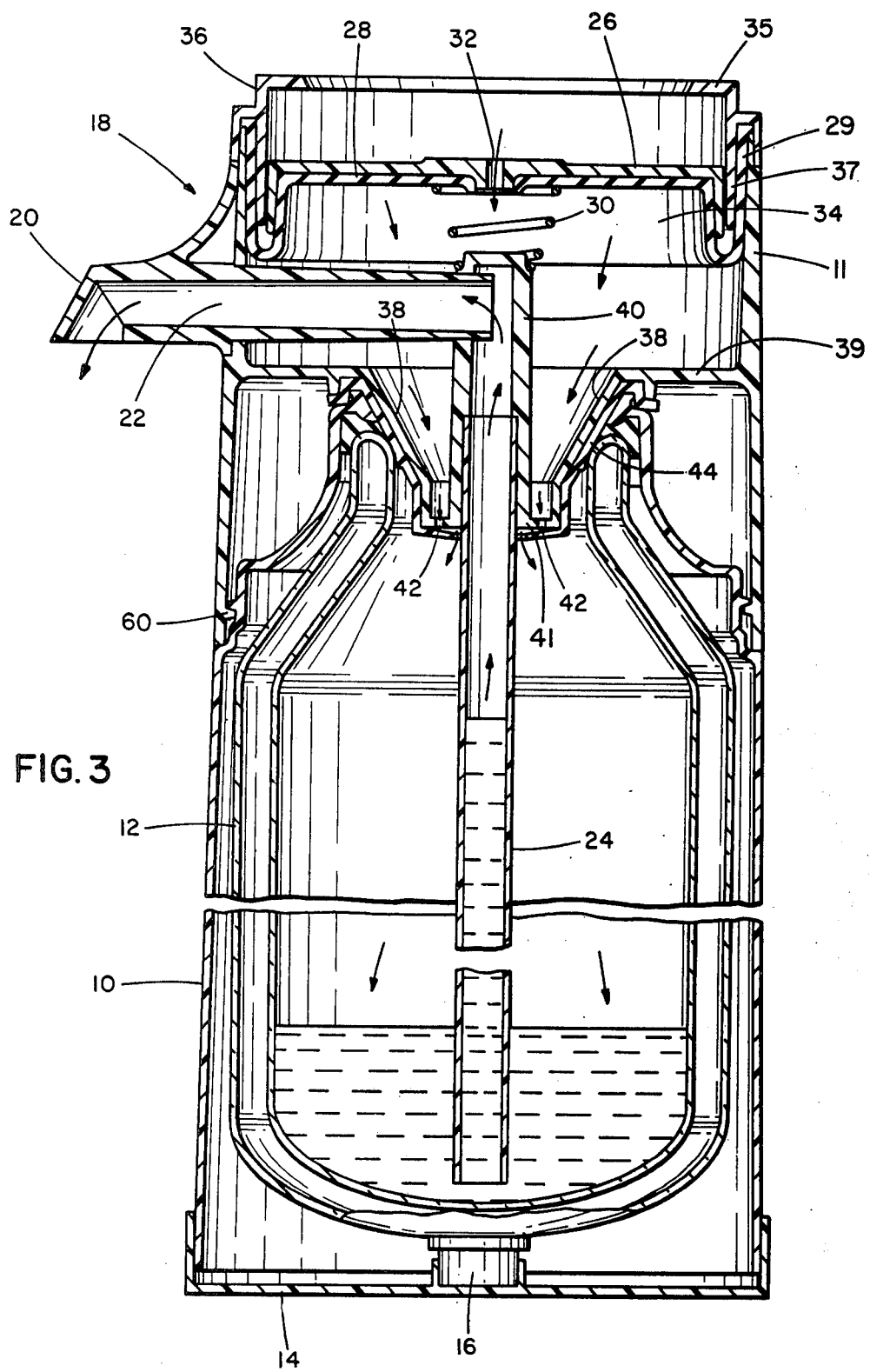
FIG. 3 is a cross sectional view of the pump dispenser and thermos bottle showing the dispenser in its actuated position.

Referring to FIGS. 1, 2 and 3, the vacuum bottle and dispenser according to the invention are illustrated. The vacuum bottle, for the purpose of the present application, includes an outer jacket 10, a vacuum filler 12, a bottom cap 14, and a filler spacer 16 which positions the filler 12 in the jacket and protects the glass nipple through which air is withdrawn from the interior of the filler. In the embodiment illustrated in FIG. 3 the filler is shown as being a narrow neck bottle, that is, one which tapers at its top to form a convenient pouring neck. As will be indicated, the pump dispenser according to the invention is also capable of being used with wide mouth bottles. A wide mouth bottle does not have the taper and, accordingly, the pump dispenser would have a dimensional change to correspond to the opening of the wide mouth filler.

The pump 18, according to the invention, includes a dispensing spout 20, a spout channel 22 and a fluid tube 24 which extends downwardly into the interior of the thermos bottle. In response to air being forced into the interior of the thermos from the pump, fluid passes upwardly through the tube 24 into the channel 22 and out of spout 20.

Air is forced into the interior of the thermos by the manually operable pump portion of the unit which includes a disk 26, a flexible sealing member or pump diaphragm 28 and a return spring 30. The disk 26 has an air port 32 located at its center for permitting the passage of air to an interior space 34 which is enclosed in part by the pump diaphragm 28. The disk is retained in the position shown by FIG. 2 by the inwardly directed flange 35 of a pump housing 36. The disk 26 and diaphragm 28 can, however, move vertically downward against the bias of a spring 30 to effect the pumping action to be described. The spring 30 urges the disk and diaphragm back to their initial positions when manual pressure on the disk is removed. The diaphragm 28, which has its outer end 29 secured between an upper portion 11 of the jacket 10 and a downwardly depending portion 37 of the housing 36, effectively seals the upper portion of interior space 34 to make it airtight except for opening 32 in the disk. The inner surface of the diaphragm 28 is secured to the disk by any suitable bonding technique.

The lower portion of the space 34 is enclosed by a wall 39, a conical section 38, bottom 41, and a center post 40. The upper portion of the center post 40 provides a means for mounting the helical spring 30. Bottom portion 41 is provided with a number of openings 42 to permit the passage of air from the interior space 34 into the filler 12 in order to increase the air pressure on the surface of the liquid during pumping.

The number and size of the openings 42 depends upon the size of the pump unit and can be empirically determined for any given construction. In order to prevent liquid from entering the interior space 34 should the thermos be turned on its side or upside down a gasket 44 according to a first embodiment encompasses the conical section 38 and bottom 41 of the pump housing. When the pump is secured over the filler 12 the gasket engages the top of the filler 12 to provide a fluid seal between the filler top and the conical section 38.

As best illustrated in FIGS. 4 and 5, the central portion of the gasket has an aperture therethrough to permit the fluid tube 24 to pass downwardly into the bottle interior. When the pump is not being operated the gasket is retained in close proximity to the junction of the housing and the fluid tube. This securely covers the openings 42 to prevent the passage of liquid upwardly from the thermos into the interior space 34 (FIG. 4). When the pump dispenser is operated, however, the lower portion of the gasket flexes away from the housing and fluid tube, as indicated in FIG. 5, due to the air pressure generated by the pump unit. This permits the air to pass through the openings 42 and around the gasket end 50 into the interior of the thermos. Upon completion of the pumping operation the gasket returns to its FIG. 4 position to again seal the pumping unit.

Operation of the pump unit as thus far described is as follows. The unit is secured to a thermos or other container for liquids by securing it to the top in the manner illustrated in FIGS. 1 and 3. When it is desired to dispense fluid from the interior without the need for pouring or opening the container the index finger or thumb of the user is placed over the opening 32 of the disk 26 thereby sealing the pump interior 34. The user then applies downward pressure to the disk while maintaining the seal thereby forcing the air contained in the interior space 34 downwardly through the openings 42 into the interior of the vacuum bottle. This air pressure acts in a well understood manner to force the fluid in the container up the fluid tube 24 through the channel 22 and out the spout 20 to a cup or glass, as desired. During pumping the gasket 44 alternately seals and unseals the openings 42 to prevent back flow of liquid while permitting entry of air to the container.

At the bottom of its travel the pump disk 26 is released by the user and the air port 32 is unblocked. This permits the return spring 30 to return the disk and the attached diaphragm 28 back to the initial position illustrated in FIG. 2. This also fills the interior 34 with air in preparation for the next pumping stroke.

Figure 9:
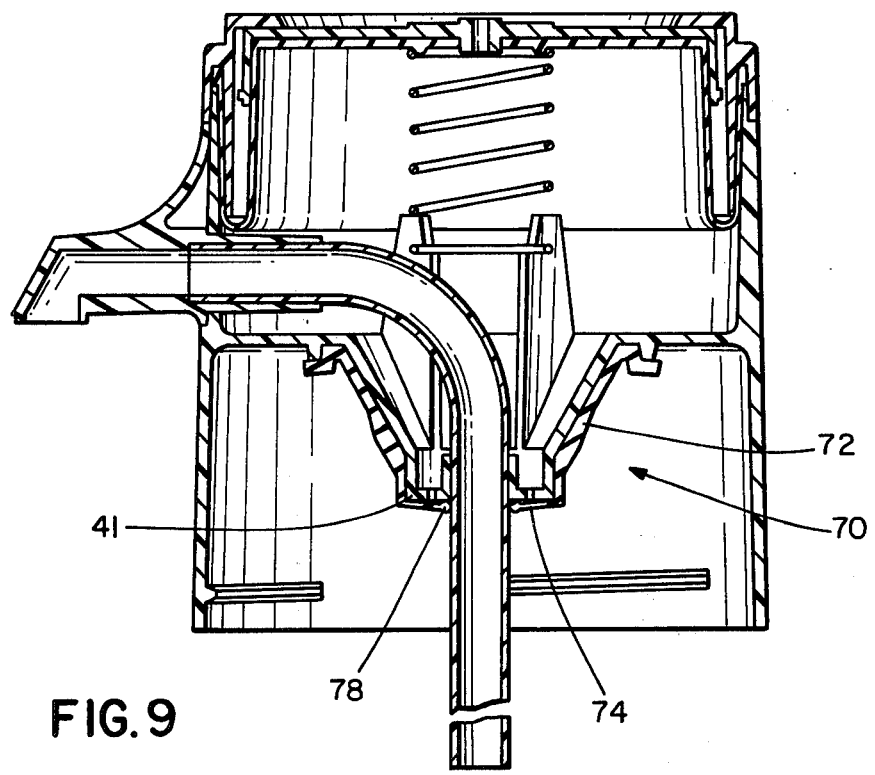
FIG. 9 is a view similar to FIG. 2 illustrating the use of a gasket according to a second embodiment of the invention.
Figure 10:
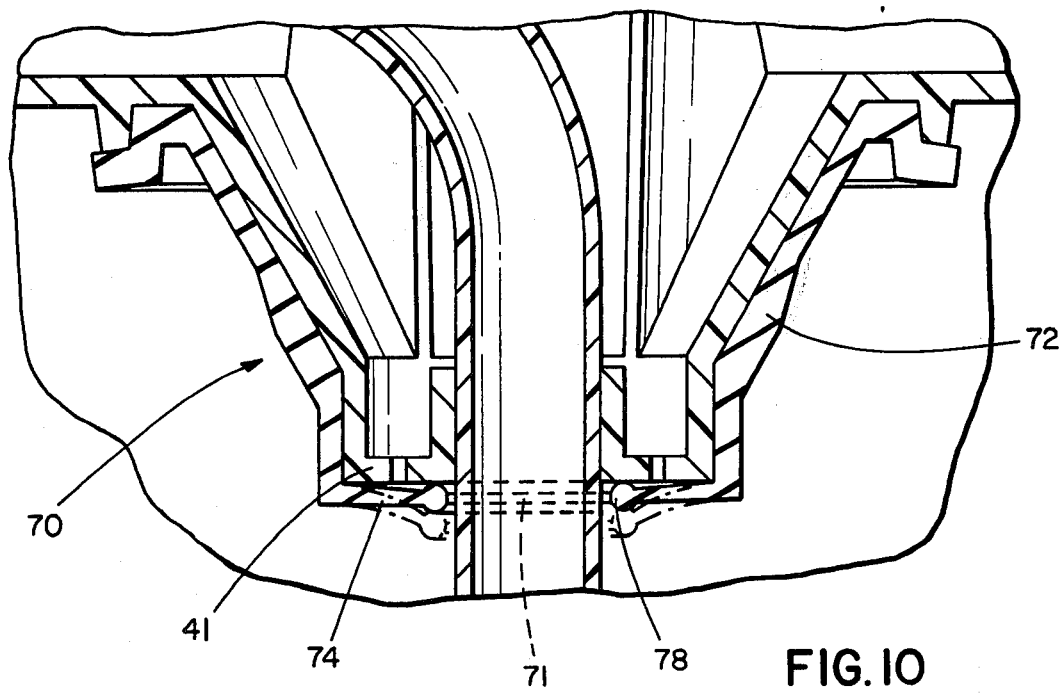
FIG. 10 is a sectional view similar to FIGS. 4 and 5 illustrating the operation of the gasket according to the second embodiment.

Referring to FIGS. 9 and 10, a sealing arrangement according to a second embodiment of the invention is illustrated. Unlike the FIG. 1 embodiment, the gasket illustrated in FIGS. 9 and 10 is not in physical contact with the fluid tube 24. Instead, it is spaced slightly therefrom by virtue of having a slightly larger diameter aperture 71. The following dimensions are exemplary of the type of relationship between the outside diameter of the fluid tube and the diameter of the aperture through the bottom of the gasket:

tube diameter — 0.37 inches
gasket aperture — 0.40 inches

A gasket 70, according to the second embodiment, is provided with a relatively thick tapering wall 72 and a relatively thin bottom wall 74. The opening 71 through the bottom of the gasket is defined by a circular bead 78 of increased dimension as compared to the bottom wall 74. As illustrated in FIGS. 9 and 10, bead 78 is intended to normally maintain contact with the bottom portion 41 of the housing. The holes 42 through the bottom portion 41 are located on the side of bead 78 opposite the tube 24 so that the bead normally provides a sealing relationship to prevent liquid from entering the pump interior through the holes 42.

When air is pumped, by operation of the disk and diaphragm, the resulting air pressure causes a slight flexing of bead 78 away from bottom portion 41 permitting air to pass into the vacuum filler to dispense the liquid contained therein. As will be apparent, in order to operate properly, the gasket should be formed of a suitable material which will retain its initial shape so that it will return to the desired sealing position after each flexing away from the bottom of the housing. Many suitable materials are available for this purpose and exemplary thereof is the material sold under the trademark KRATON. As indicated in FIG. 10, the underside of gasket bottom 74 may taper upwardly and reduce in thickness (as viewed from the edge) to improve the flexing capability of the bead. The angle of taper, as measured from the edge, may be on the order of 3°. While this arrangement does not seal the pump unit against liquid as securely as the first embodiment does, it has the advantage of substantially reducing the amount of pressure required to operate the pump unit. This is due to the ease with which the gasket bead can be caused to flex away from the housing bottom 41 as compared to the pressure required to pass air around the gasket illustrated in FIGS. 4 and 5.

Referring now to FIGS. 6 and 7, an important feature of the present invention is illustrated. During the manual pumping operation there is a tendency for the pump disk 26 to wobble, twist or otherwise become angularly disoriented from its intended position. This does have a material affect on the pumping operation in that it increases the difficulty of operation and may cause the unit to jam. It is, therefore, desirable that the disk stay essentially perpendicular to the fluid tube during its movement between the FIG. 2 and FIG. 3 positions. In order to prevent this undesirable movement of the disk 26, the pump housing 36 is provided with a plurality of guide ribs 52 spaced around its circumference. The ribs extend vertically substantially the entire length of travel of the disk between the positions illustrated in FIGS. 2 and 3. The disk 26 is provided with a corresponding set of grooves defined by projections 56 and 58 which mate with the guide ribs 52. Thus, as the disk moves vertically, twisting movement of the disk is prevented by the projections tracking along the vertical length of the guide ribs. Large angular displacement of the disk is also generally avoided by employing these ribs since this problem is in part caused by the twisting movement of the disk. Thus, the guide rib and groove arrangement provides a smoother and more efficient pumping operation than would otherwise be obtained.

As indicated in FIGS. 2 and 3, the pump unit may be provided with an internal thread 60 for engaging a mating thread on the jacket 10 of the thermos bottle. The conical section 38 of the pump housing is dimensioned to securely seal on the filler opening so that as the threads are engaged the gasket 44 effects a good seal between the pump unit and the top of the filler. The threads 60 permit the pump housing to engage the thermos bottle jacket quickly and conveniently to allow the pump unit to be attached to or removed from the thermos bottle for cleaning and refilling purposes.

As mentioned earlier, this pump unit is designed for use with vacuum bottles or similar insulated containers, such as, foam bottles and the like. FIG. 8 illustrates the use of a pump unit according to the invention in conjunction with a quart container 64 which may be of the foam type or similar construction.

While we have shown and described embodiments of this invention is some detail, it will be understood that this description and illustrations are offered merely by way of example, and that the invention is to be limited in scope only by the appended claims.

We claim:

1. A manually operated pump dispenser for a container comprising:
   (a) a pump housing having an interior space,
   (b) displaceable diaphragm means in said housing for pumping air into said container, said diaphragm means having a sealable opening therethrough to permit air to enter said interior space and including
      (i) a circular disk having an aperture therethrough and a downwardly projecting rim at its outer circumference, and
      (ii) a flexible diaphragm having an inner portion and an outer periphery terminating radially outwardly of said inner portion, the inner portion of said diaphragm being in contact with said disk, the outer periphery thereof being attached to said housing adjacent the upper end of said housing,
   (c) at least one opening through the bottom of said housing for communicating said enclosed space with the interior of said container,
   (d) said diaphragm means opening being sealed during the downward displacement of said diaphragm means to force air in said interior space into the container interior via said bottom opening, and left unsealed during upward displacement of the diaphragm means to draw air into said interior space, and
   (e) means for permitting fluid to pass out of said container responsive to the air pressure created in said container from the downward displacement of said diaphragm means.

2. The device according to claim 1 wherein said permitting means includes a fluid tube extending into said container to a point near the bottom of the container.

3. The combination according to claim 1 wherein said diaphragm includes an outer portion which doubles back upon itself and terminates in an edge secured in position against said housing.

4. In combination an insulated container having a pouring opening through which liquids pass into and out of the interior of the container and a pump dispenser for said container adapted to removably engage the container and seal the pouring opening to prevent heat loss and spilling, said dispenser including:
   (a) a pump housing defining an interior space and having a first opening therein and at least one opening through the bottom of said housing, the latter opening for communicating said interior space with the interior of said container,
   (b) means positioned in said housing for pumping air into said container including:
      (i) a rigid force applying member positioned directly beneath said first opening and accessible therethrough for direct user actuation,
      (ii) a flexible diaphragm having an inner portion and an outer periphery terminating radially outwardly of said inner portion, the inner portion of said diaphragm being in contact with said force applying member, the outer periphery thereof being attached to said housing adjacent the upper end of said housing,
   (c) at least one opening through the bottom of said housing for communicating said enclosed space with the interior of said container,
   (d) said diaphragm means opening being sealed during downward displacement of said diaphragm means to force air in said interior space into the container interior via said bottom opening, and left unsealed during upward displacement of the diaphragm means to draw air into said interior space, and
   (e) means for permitting fluid to pass out of the container in response to air pressure created therein as the result of the downward displacement of said diaphragm means.

5. The device according to claim 4 further including means for restricting liquid in the container from entering said pumping means, said restricting means including a gasket on said pump dispenser normally in a position to restrict liquid from entering said pump means but flexible to a position permitting air to pass from the pumping means into said container when said pump means is operated.

6. The device according to claim 4 wherein said permitting means includes a fluid tube extending into said container to a point near the bottom of the container.

7. The dispenser according to claim 4 wherein said pump housing includes means for removably engaging said container whereby the dispenser may be easily attached to and removed therefrom.

8. The dispenser according to claim 7 wherein the pump is positioned over the pouring opening of said container.

9. The device according to claim 4 wherein said pump means includes a spring for moving said force applying member upwardly in the absence of manual pressure thereon.

10. The combination according to claim 4 wherein said diaphragm includes an outer portion which doubles back upon itself and terminates in an edge secured in position against said housing.

11. The combination according to claim 4 wherein said diaphragm includes:
   (a) an inner portion extending substantially across said first opening in contact with said force applying member,
   (b) an outer portion including a first part, and a second part which doubles back upon said first part and terminates in an edge secured in position against said housing, said diaphragm being displaceable in said housing by the movement of the first part of the outer portion relative to the second part.

12. The combination of claim 4 wherein said insulated container comprises a vacuum insulated filler.

13. The combination of claim 12 wherein said rigid force applying member is a circular disk having an aperture therethrough.

14. The dispenser according to claim 13 further including a plurality of vertically disposed ribs on said housing and a plurality of mating grooves on said disk whereby during vertical displacement of said disk relative to said housing, said disk is restrained from twisting or tilting.

15. A manually operated pump dispenser for a container comprising:
   (a) a pump housing defining an interior space and having a first opening therein and at least one opening through the bottom of said housing, the latter opening for communicating said interior space with the interior of said container,
   (b) means positioned in said housing for pumping air into said container including:
      (i) a rigid force applying member positioned directly beneath said first opening and accessible therethrough for direct user actuation,
      (ii) a flexible diaphragm including an outer portion which doubles back on itself disposed directly beneath said force applying member and in contact therewith, the outer edge of said diaphragm secured in position against said housing,
   (c) means for permitting fluid to pass out of the container in response to the air pressure created in said container from the downward displacement of said pumping means.

16. The pump dispenser of claim 15 wherein said diaphragm has an inner portion extending substantially across said first opening in contact with said force applying member.

17. The pump according to claim 16 wherein said housing includes a downwardly depending member which separates the first and second parts of said outer portion.

* * * * *

REEXAMINATION CERTIFICATE (699th)
United States Patent [19]
Frazier et al.

[11] B1 4,113,147
[45] Certificate Issued Jun. 9, 1987

[54] VACUUM BOTTLE WITH AIR PUMP TO PRESSURIZED BOTTLE TO EFFECT DISPENSING

[75] Inventors: Albert A. Frazier, Nashville; Howard W. Phillips, Brentwood, both of Tenn.

[73] Assignee: Aladdin Industries, Incorporated, Nashville, Tenn.

Reexamination Request:
 No. 90/000,648, Oct. 12, 1984

Reexamination Certificate for:
 Patent No.: 4,113,147
 Issued: Sep. 12, 1978
 Appl. No.: 837,519
 Filed: Sep. 29, 1977

Related U.S. Application Data

[63] Continuation in part of Ser. No. 803,736, Jun. 6, 1977, abandoned.

[51] Int. Cl.⁴ .......................... B67D 5/60; B67D 5/40
[52] U.S. Cl. .................................... 222/131; 222/209; 222/383; 222/401
[58] Field of Search ............................ 222/130, 131

[56] References Cited
U.S. PATENT DOCUMENTS
2,275,607  3/1942  Bramming .......................... 221/76
4,174,053  11/1979  Shimizu ........................ 222/131 X

FOREIGN PATENT DOCUMENTS
772241  10/1934  France .

OTHER PUBLICATIONS

Design Manual, "Bellofram ® Rolling Diaphragms", copyright notice of 1960, 1962 by Bellofram Corporation.

*Primary Examiner*—Joseph R. Rolla

[57] ABSTRACT

A vacuum bottle includes a pump dispenser for dispensing liquids from the temperature insulating interior without the need for removing the top or pouring. The pump dispenser employs a manually operated disk to pump air from a diaphragm into the bottle interior where it forces the liquid contents up a fluid tube and out a dispensing spout. A plurality of spaced ribs improve the operation of the dispenser mechanism by preventing twisting of the disk during pumping.

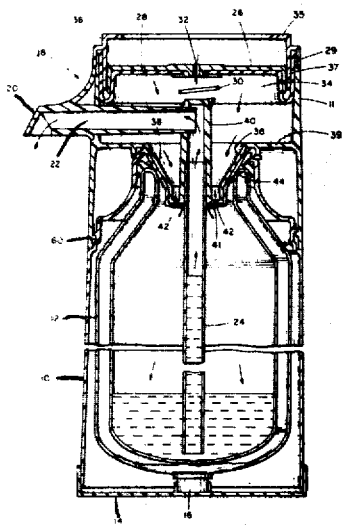

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 14 and 15 are determined to be patentable as amended.

Claims 2, 3, 5–13, 16 and 17, dependent on an amended claim, are determined to be patentable.

1. A manually operated pump dispenser for a container comprising:
   (a) a pump housing having an interior space,
   (b) displaceable diaphragm means in said housing for pumping air into said container, said diaphragm means having a sealable opening therethrough to permit air to enter said interior space and including
      (i) a circular disk having an aperture therethrough and a downwardly projecting rim at its outer circumference, and
      (ii) a flexible diaphragm having an inner portion and an outer periphery terminating radially outwardly of said inner portion, the inner portion of said diaphragm being in contact with said disk, the outer periphery thereof being attached to said housing adjacent the upper end of said housing.
   (c) at least one opening through the bottom of said housing for communicating said [enclosed] *interior* space with the interior of said container,
   (d) said diaphragm means opening being sealed during the downward displacement of said diaphragm means to force air in said interior space into the container interior via said bottom opening, and left unsealed during upward displacement of the diaphragm means to draw air into said interior space, and
   (e) means for permitting fluid to pass out of said container responsive to the air pressure created in said container from the downward displacement of said diaphragm means.

4. In combination an insulated container having a pouring opening through which liquids pass into and out of the interior of the container and a pump dispenser for said container adapted to removably engage the container and seal the pouring opening to prevent heat loss and spilling, said dispenser including:
   (a) a pump housing defining an interior space and having a first opening therein and at least one opening through the bottom of said housing, the latter opening for communicating said interior space with the interior of said container,
   (b) means positioned in said housing for pumping air into said container including:
      (i) a rigid force applying member positioned directly beneath said first opening and accessible therethrough for direct user actuation,
      (ii) a flexible diaphragm *means having an opening permitting air to enter said interior space, said* diaphragm having an inner portion and an outer periphery terminating radially outwardly of said inner portion, the inner portion of said diaphragm being in contact with said force applying member, the outer periphery thereof being attached to said housing adjacent the upper end of said housing,
   [(c) at least one opening through the bottom of said housing for communicating said enclosed space with the interior of said container,]
   [(d)] *(c)* said diaphragm means opening being sealed during downward displacement of said diaphragm means to force air in said interior space into the container interior via said bottom opening, and left unsealed during upward displacement of the diaphragm means to draw air into said interior space, and
   [(e)] *(d)* means for permitting fluid to pass out of the container in response to air pressure created therein as the result of the downward displacement of said diaphragm means.

14. [The dispenser according to claim 13] *In combination an insulated container having a pouring opening through which liquids pass into and out of the interior of the container and a pump dispenser for said container adapted to removably engage the container and seal the pouring opening to prevent heat loss and spilling, said dispenser including:*
   *(a) a pump housing defining an interior space and having a first opening therein and at least one opening through the bottom of said housing, the latter opening for communicating said interior space with the interior of said container,*
   *(b) means positioned in said housing for pumping air into said container including:*
      *(i) a rigid force applying member positioned directly beneath said first opening and accessible therethrough for direct user actuation,*
      *(ii) a flexible diaphragm having an inner portion and an outer periphery terminating radially outwardly of said inner portion, the inner portion of said diaphragm being in contact with said force applying member, the outer periphery thereof being attached to said housing adjacent the upper end of said housing,*
   *(c) at least one opening through the bottom of said housing for communicating said enclosed space with the interior of said container,*
   *(d) said diaphragm means opening being sealed during downward displacement of said diaphragm means to force air in said interior space into the container interior via said bottom opening, and left unsealed during upward displacement of the diaphragm means to draw air into said interior space,*
   *(e) means for permitting fluid to pass out of the container in response to air pressure created therein as the result of the downward displacement of said diaphragm means,*
   *(f) wherein said insulated container comprises a vacuum insulated filler,*
   *(g) wherein said ridid force applying member is a circular disk having an aperture therethrough, and*
   *(h)* further including a plurality of vertically disposed ribs on said housing and a plurality of mating grooves on said disk whereby during vertical displacement of said disk relative to said housing, said disk is restrained from twisting or tilting.

15. A manually operated pump dispenser for a container comprising:

(a) a pump housing defining an interior space and having a first opening therein and at least one opening through the bottom of said housing, the latter opening for communicating said interior space with the interior of said container, (b) means positioned in said housing for pumping air into said container including:

(i) a rigid force applying member positioned directly beneath said first opening and accessible therethrough for direct user actuation, (ii) a flexible diaphragm including an outer portion which doubles back on itself disposed directly beneath said force applying member and in contact therewith, the outer edge of said diaphragm secured in position [against] *by attachment to* said housing, (c) means for permitting fluid to pass out of the container in response to the air pressure created in said container from the downward displacement of said pumping means.

* * * * *